UNITED STATES PATENT OFFICE.

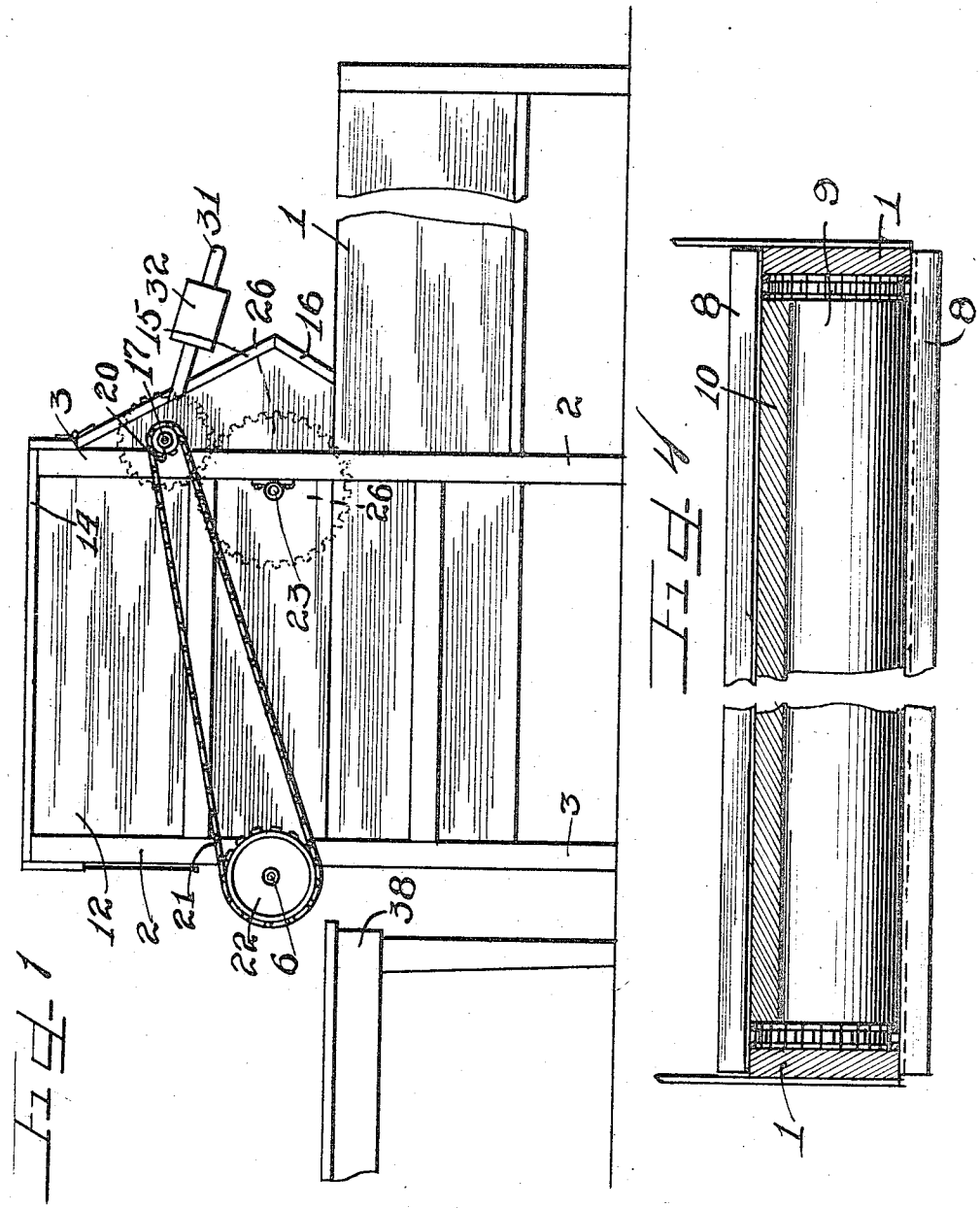

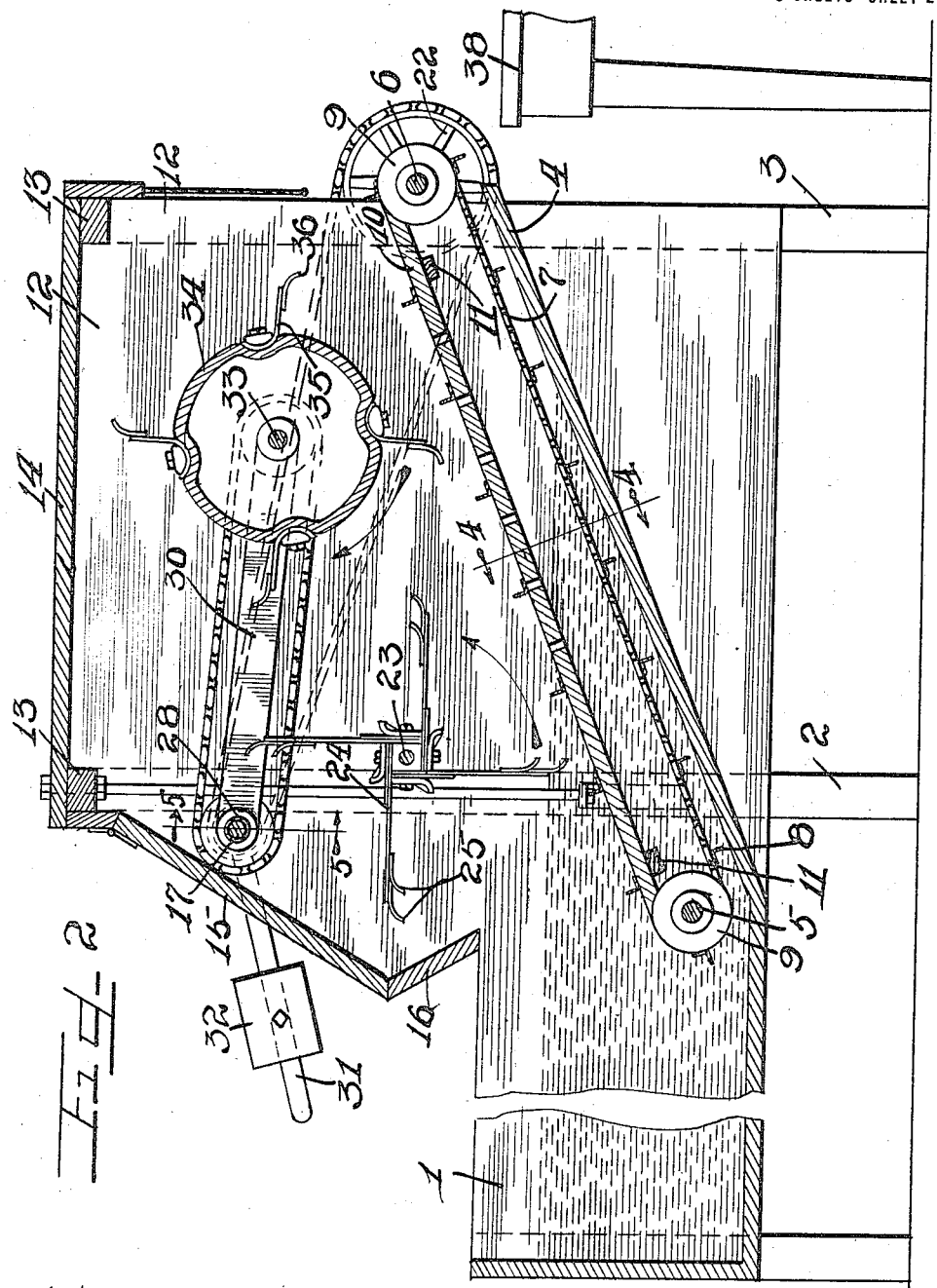

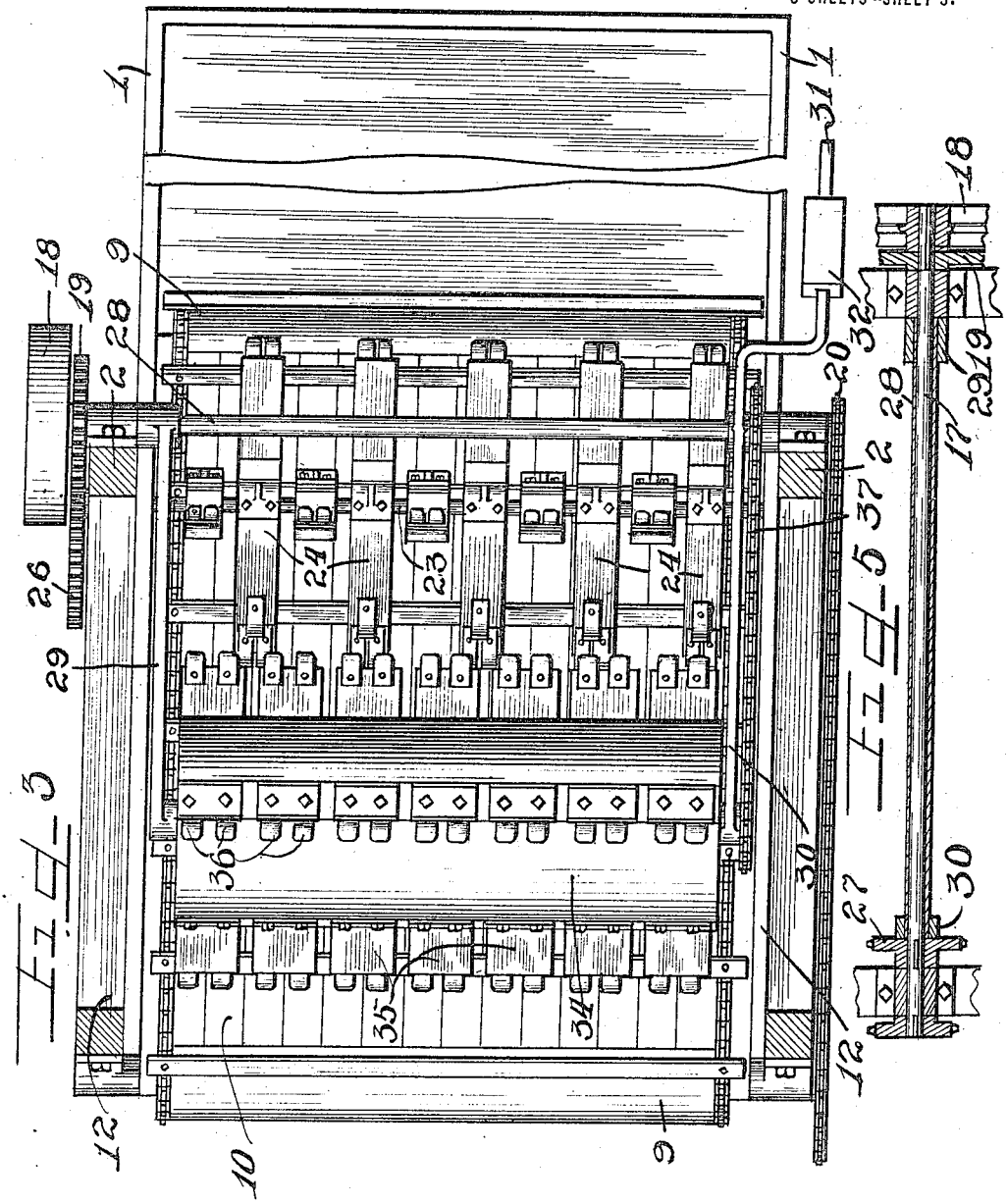

JOHN W. KOHLHEPP, OF CHICAGO, ILLINOIS, ASSIGNOR TO THE ALLBRIGHT-NELL COMPANY, A CORPORATION OF ILLINOIS.

CARCASS DEHAIRING AND SCRAPING MACHINE.

1,260,269.

Specification of Letters Patent.    Patented Mar. 19, 1918.

Application filed January 24, 1913. Serial No. 743,937.

*To all whom it may concern:*

Be it known that I, JOHN W. KOHLHEPP, a citizen of the United States, and a resident of the city of Chicago, in the county of Cook and State of Illinois, have invented certain new and useful Improvements in Carcass Dehairing and Scraping Machines; and I do hereby declare that the following is a full, clear, and exact description of the same, reference being had to the accompanying drawings, and to the numbers of reference marked thereon, which form a part of this specification.

This invention relates to carcass dehairing and scraping machines of that class set forth in my Letters Patent for "Carcass scalding, dehairing & polishing machines", dated January 2, 1917, No. 1,201,951, and wherein a continuously movable conveying and scraping element acted to convey the carcasses direct from the scalding tank into the field of operation of other scraping mechanism, and thence to discharge the same from the machine when the carcass was fully scraped.

The object of this invention is to thoroughly and completely scrape and dehair the carcasses, and to remove from the surface of the carcass any scurf skin, dirt or dehairing matter, and to that end various types of scraping and dehairing elements are combined, each acting characteristically upon the carcass to improve the general result.

It is an object of the invention to afford a continuously traveling scraping element, adapted to convey the carcass into the field of other scraping elements, and to associate therewith revoluble beating and scraping elements, whereby the skin is thoroughly worked and cleaned.

It is also an object of the invention to afford in a device of the class described revoluble scraping mechanisms coacting with revoluble beating and scraping mechanisms for the purpose specified.

It is a further object of the invention to afford in a machine such as described, a revoluble scraping device equipped with scraping blades more or less yieldingly engaged thereto, and arranged to normally resist discharge of the carcasses from the machine, and adapted when shifted, to permit the remaining scraping elements to eject the carcass.

The invention (in a preferred form) is illustrated in the drawings, and hereinafter more fully described.

In the drawings:

Figure 1 is a side elevation of a device embodying my invention.

Fig. 2 is a central, longitudinal section thereof.

Fig. 3 is a top plan view of the same, with the top and doors removed.

Fig. 4 is an enlarged, fragmentary section on line 4—4 of Fig. 2.

Fig. 5 is an enlarged, fragmentary section on line 5—5 of Fig. 2.

As shown in the drawings:

1, indicates the scalding tank or tub, which may be constructed as usual, and mounted upon which, at one end thereof, is an upright frame comprising posts 2 and 3, secured on each side of the tank, and which may afford the legs or supports for the tank at their lower ends. As shown, the bottom 4, of the tank at the rear end thereof, inclines upwardly from a point in advance of the front leg or post 2, to the end of the tank.

Journaled in the tank near the bottom thereof, and in advance of the front legs 2, is a shaft 5, having sprocket wheels on each end thereof adjacent the side walls of the tank. Journaled on the posts or uprights 3, at the rear end of the tank above the tank, is a shaft 6, also provided with sprocket wheels near each of the side walls of the tank and in alinement with the sprocket wheels on the shaft 5. Trained about said sprocket wheels are sprocket chains 7, which are connected transversely the machine by transverse scraping and carrier bars 8, which, as shown, are metallic angle bars rigidly secured at their ends to the sprocket chains and at substantially equal distances apart.

As shown, a drum 9, is provided on each of said shafts, filling the space between the sprocket wheels and extending in inclined position and substantially flush with the top of each drum, and filling the space between the sprocket chains is an apertured or slotted floor 10, as shown clearly in Fig. 2, which may be supported, if desired, on bars 11, extending transversely the tank and secured to the side walls thereof, and positioned to support said floor 10, to afford a slight clearance between the rolls 9, and the ends thereof.

Suitable side walls 12, are secured on said posts and connecting said posts transversely the machine at the top thereof, are transverse beams 13, which afford the support for a cover 14, which may be removably engaged thereto in any suitable manner. As shown also, the side walls extend forwardly from the post 2, and a door 15, hinged near the top of said posts, closes against the ends of said side walls, and at its lower edge 16, inclines inwardly, as shown in Fig. 2, to the top of the tank to afford as much open space as possible for the tank, adjacent the receiving end of the scraping mechanism.

Extending transversely the machine and journaled on the forward side of the post 2, well above the tank, is a shaft 17, provided at one extremity with a driving belt pulley 18, and adjacent the same having a gear wheel 19, rigidly secured thereon. Said shaft at its opposite extremity on the other side of the tank, is provided with a sprocket wheel 20, about which is trained a sprocket chain 21, which is also trained about a sprocket wheel 22, secured on the shaft 6, thereby communicating the drive directly to the conveying and scraping carrier.

Journaled on the rear side of the post 2, and below the shaft 17, is a shaft 23, which extends transversely the machine, and secured on which, in any suitable or convenient manner, are flexible beating and scraping arms 24, any desired number of which may be secured thereon. Conveniently, said beating and scraping elements may comprise strips of heavy canvas or rubber belting of suitable length, those of each group being arranged substantially at an angle of 90° with the adjacent scraping and beating arms, and on the extremities of which are curved scraping blades 25, if desired, such as the looped beaters forming the subject matter of Letters Patent No. 954,431, (issued to Alfred Hannaford, on the 12th day of April, 1910) may be used.

Rigidly secured on the shaft 23, at one of its outer ends, is a gear wheel 26, which meshes with the gear wheel 19, on the shaft 17, whereby the beating and scraping arms on said shaft 23, strike inwardly and upwardly in close proximity with the carrying and scraping conveyer, the ends of said beaters dipping into the water of the tank sufficiently to constantly dash the hot water from the tank over the carcasses during the beating operation.

Rigidly secured on the shaft 17, at the end thereof, remote from the driving pulley 18, is a sprocket wheel 27, which is positioned at the inner side of the bearing for said shaft on the post 2, and close to the inner wall of the machine. Rotatably secured on the shaft 17, and extending from the hub of said sprocket wheel to near the bearing for the shaft at the opposite side of the machine, is a sleeve 28. Rigidly secured on said sleeve at each end thereof, are rearwardly directed arms 29 and 30, which, being rigidly secured upon the sleeve, are thereby held at all times in unvarying parallel relation. The end of the bar 30, is extended forwardly beyond the sleeve and offset laterally to afford a lever 31, and adjustably secured on said lever arm 31, is a counterweight 32.

Rigidly secured on a shaft 33, journaled on the rear ends of said arms, is a transverse drum 34, which may be provided with concavities in its periphery, as shown in Fig. 2, and engaged in which are short, resilient projections 35, on each of which is secured one or more scraping blades 36. Said resilient projections 35, may be constructed of short and stiff pieces of rubber belting, or may be constructed of any material affording a degree of resiliency, the object being to so engage the scraping blades 36, upon the drum, that said blades act only as scraping blades, but the engagement thereof with the drum should be sufficiently yielding to permit the blades to yield somewhat when subjected to unusual resistance. A sprocket wheel is provided on the end of the shaft 33, and a sprocket chain 37, is trained about the same and about the sprocket wheel 27, to communicate the drive of the shaft 17, thereby rotating the drum so that the scraping blades thereof act downwardly on the carcasses or, in other words, act oppositely of the draft of the scraping conveyer.

As shown, a table 38, is provided at the rear end of the machine, upon which the scraped carcasses are delivered from the machine, and from which the same may be taken by any suitable carriers, or otherwise, where desired. As shown also, a sufficient clearance space is provided between the forward edge of the table and the carrier end of the machine, to permit the hair and refuse to fall between the machine and the table when withdrawn from the machine by the carrier. As shown a gravity closing door adapted to be opened by the carcass as it passes therepast, is hung to close the discharge opening in the casing.

The operation is as follows:

The carcasses, when properly scalded, are presented one by one to the conveyer by an operator, who stands at the operating side of the machine, with the lever 31, convenient of access to him. As the carcass is drawn upwardly by the conveyer, the beaters secured on the shaft 23, almost immediately engage the same, and striking upwardly and inwardly on the carcass, assist the conveyer in withdrawing the carcass from the tank and into the machine.

As the carcass passes inwardly, the forward end of the carcass is engaged by the scrapers on the inwardly rotating drum 34, and further upward movement being arrested, the carcass, by the conjoint action of the beaters and the scrapers on the drum 34, is whirled transversely the machine, and the action of the track of the conveyer, and the action of the beaters and scrapers on the carcass causes the same to revolve rapidly. The scraping blades or bars 8, on the carrier or conveyer, as the carcasses roll thereby, act to practically the entire length of the carcass to scrape the hair and refuse therefrom, and, together with the upward action of the beaters, the upward travel of the chain is constantly presenting all parts of the carcass to the action of the relatively stiff scraping blades in the most efficacious manner to permit said scraping blades to act to best advantage in thoroughly scraping the carcass, said blades, although relatively stiffly engaged upon the drum, yielding sufficiently to permit the individual blades to enter to all parts of the surface of the carcass, effectively scraping the same.

During the entire operation, the beaters act to assist the carcasses into the machine; to constantly dash the hot water from the tank thereover; to beat and work—in fact, to practically massage the skin of the carcass, working all dirt and refuse therefrom, and, owing to the flexibility of the beaters, entering all parts of the flank, legs, and head, to remove from the surface thereof, all hair and refuse not so conveniently reached by the other scraping elements of the machine. It will thus be seen that each of the characteristic scraping elements of the machine performs its portion of the work both conjointly, and in coöperation with the other scraping elements in the machine, and to a degree, acts independently of said other mechanisms and characteristically, with the result of effectively and thoroughly dehairing, cleaning, and polishing the entire area of the skin of the carcass, actually massaging the dirt and refuse even from the pores of the skin.

When the carcass has been subjected to the operation of the machine for a sufficient period of time in the judgment of the operator, to enable the operation to be completed, the workman operates the lever 31, downwardly, elevating the scraping roll or drum 34, and permitting the carcass to be promptly delivered from the machine by the conveyer, and to drop upon the table 38. Upon releasing the lever, the scraping roll immediately drops back into operative position, inasmuch as the counterweight is not sufficient to balance the weight of the roll, and the operation is repeated. All hair and refuse removed from the carcass is drawn upwardly along the floor 10, and over the roll 9, at the discharge end of the machine, and drops to the floor between the rear end of the machine and the table 38.

I have shown but a preferred embodiment of my invention. It is to be understood, therefore, that I do not purpose limiting the patent granted on this application otherwise than necessitated by the prior art, as numerous details and variations from the construction herein illustrated and described, will readily suggest themselves without departing from the principles of the invention.

I claim as my invention:

1. A hog scraping machine, comprising the scalding tank, a scraping and conveying device extending thereinto and acting to withdraw the carcasses therefrom, scraping mechanisms acting upwardly and inwardly on the carcass to facilitate the withdrawal thereof from the tub, a rotative drum arranged transversely the scraping conveyer, scrapers on the peripheral surface thereof adapted to engage, scrape and rotate the carcasses conjointly with the aforesaid scraping mechanism, and means swinging said drum out of action to permit the ejection of the carcass.

2. A scraping machine for carcasses, embracing a traveling scraping conveyer adapted to freely contact the carcasses and convey the same into and from the machine, rotative scraping means acting on the carcasses to assist in delivering them into the machine, an oppositely rotating cylinder, scrapers on the outer surface thereof, acting to retain the carcasses in the machine and to rotate the same upon the scraping conveyer, and means shifting said rotative scrapers out of action to permit the scraping carrier to discharge the carcasses.

3. A device of the class described, embracing a continuously traveling scraping conveyer, continuously rotating upwardly acting beaters acting with the scraping carrier to deliver the carcasses into the machine and also to dash water from the tank thereover, a rotatable movably mounted drum arranged transversely the carrier, scraper blades flexibly mounted thereon and acting to retain the carcasses in the machine and to scrape and rotate the same upon the carrier, and a lever adapted for manual actuation for moving said scrapers out of the field of action.

4. A scraping machine, embracing a scraping conveyer for drawing the carcasses into the machine, freely supporting the same, and ejecting the same from the machine, revoluble scraping elements arranged in parallel relation, the one acting inwardly and upwardly upon the carcasses, the other comprising a drum, resilient means attached on the periphery thereof, scraper blades connected on said means acting oppositely on the carcass, said elements conjointly acting to retain the carcass upon the scraping carrier and to rotate the same, and mechanism controlled by an operator for shifting one of the same out of the field of operation to permit the carrier to discharge the carcasses.

5. A machine of the class described, embracing an inclined stationary support, a continuously traveling carrier moving thereover, scraping bars thereon for moving and scraping the carcasses, means for showering carcasses thereon with hot water, a rotative drum mounted transversely the scraping carrier and acting downwardly and oppositely therefrom, relatively stiff, but yielding blades thereon, acting conjointly with the carrier, to rotate the carcasses, and mechanism for moving said rotative scraper out of action whereby the scraping carrier ejects the carcass.

6. A machine of the class described, embracing a continuously movable carrying and scraping element, stationary means coacting therewith to aid in supporting a carcass, a continuously rotatable drum movably mounted adjacent thereto, scraping blades thereon, means driving the carrier and drum whereby the same conjointly rotate and scrape the carcasses, and means throwing one of said elements out of action to permit the other to discharge the carcass when scraped.

7. A device of the class described, embracing a stationary inclined support, a scraping and dehairing device adapted to aid in supporting the carcasses during the operation, rotatable scrapers movably mounted to operate in conjunction therewith to rotate and scrape the carcasses, and mechanism for elevating the same out of the field of operation to permit the other of said scraping devices to eject the carcasses from therebeneath.

8. In a device of the class described, a stationary support, conveying mechanism moving thereover adapted to thrust a carcass therealong, beating mechanism disposed thereabove adapted to co-act therewith to dehair a carcass, and one of said beating mechanisms movable out of the field of operation to permit discharge of the carcass.

9. In a device of the class described, a stationary support, conveying mechanism moving thereover adapted to thrust a carcass therealong and assist in dehairing the same, a plurality of beating mechanisms, one moving in a direction to assist the carcass in its movement on said support and the other moving in a direction to retard the movement of the carcass on said support, and means moving one of said mechanisms out of the field of operation on the carcass.

10. In a device of the class described, an inclined stationary support, means adapted to thrust a carcass upwardly along said support, beating mechanisms normally disposed in position to retard the movement of the carcass on said support, and means moving said mechanisms out of the field of operation on said carcass to permit discharge thereof.

11. In a device of the class described, the combination with an inclined stationary support, of means for conveying a carcass upwardly therealong freely contacting with said carcass, and beating mechanism normally disposed in the path of the carcass on said support to retard the same in movement therealong, and adapted to be moved out of the field of operation on said carcass to permit further progress along said stationary support by said conveying means.

12. In a machine of the class described, rotatable dehairing means comprising flexible arms, scraper blades thereon, said arms rotated upwardly beneath a carcass to impart a rotative movement thereto, and tending to thrust the carcass upwardly, and a pivoted throw-out mechanism disposed to resist the movement of the carcass as thrust thereagainst by said dehairing means, and when thrown upwardly, permitting discharge of the carcass from the machine.

13. In a machine of the class described, dehairing means comprising flexible arms, scraper blades thereon adapted to work upwardly on a carcass, and a pivotally mounted throw-out mechanism disposed to resist the thrust imparted to the carcass by said dehairing means and retain the carcass in the field of operation thereof, and, when thrown upwardly, permitting discharge of the carcass from the machine.

In testimony whereof I have hereunto subscribed my name in the presence of two subscribing witnesses.

JOHN W. KOHLHEPP.

Witnesses:
CHARLES W. HILLS, Jr.,
GEORGE R. MOORE.

Copies of this patent may be obtained for five cents each, by addressing the "Commissioner of Patents Washington, D. C."